(12) United States Patent
Tang

(10) Patent No.: US 8,351,137 B2
(45) Date of Patent: Jan. 8, 2013

(54) MICRO-LENS MODULE

(75) Inventor: Nai-Yuan Tang, Tainan (TW)

(73) Assignee: Himax Technologies Limited, Tainan (TW)

( * ) Notice: Subject to any disclaimer, the term of this patent is extended or adjusted under 35 U.S.C. 154(b) by 12 days.

(21) Appl. No.: 13/045,937

(22) Filed: Mar. 11, 2011

(65) Prior Publication Data

US 2012/0229919 A1    Sep. 13, 2012

(51) Int. Cl.
G02B 9/04 (2006.01)
G02B 9/06 (2006.01)
G02B 9/12 (2006.01)
(52) U.S. Cl. .................. 359/793; 359/794; 359/791
(58) Field of Classification Search .............. 359/741, 359/748, 784, 786, 794, 795, 716, 717
See application file for complete search history.

(56) References Cited

U.S. PATENT DOCUMENTS 8,054,564 B1 * 11/2011 Kathman ............... 359/796
2006/0012889 A1 * 1/2006 Kojima et al. ............ 359/741

* cited by examiner

*Primary Examiner* — Alicia M Harrington
(74) *Attorney, Agent, or Firm* — J.C. Patents

(57) ABSTRACT

A micro-lens module including a plurality of lens groups is provided. The lens groups are disposed between an object side and an image side, wherein at least one lens group in the lens groups is composed by a complex lens. The complex lens includes a plurality of lenses, the lenses are adhered to each other, and an index of at least one lens in the lenses is different from indexes of the other lens in the lenses. The provided micro-lens module has an improved imaging quality and a miniaturized size while considering a manufacturing convenience.

20 Claims, 6 Drawing Sheets

MICRO-LENS MODULE

BACKGROUND

1. Field of the Invention

The invention relates to a lens module. Particularly, the invention relates to a micro-lens module.

2. Description of Related Art

Along with progress of technology, various portable electronic products such as mobile phones, personal digital assistants (PDAs), notebook computers, tablet computers, etc. are generally equipped with a micro camera lens to facilitate users taking pictures in daily life. With a development trend of continuous improvement in performance and declining in price, the camera function has become a basic function of the portable electronic products.

Generally, the micro camera lens is equipped with an image sensor, for example, a charge coupled device (CCD) or a complementary metal-oxide-semiconductor (CMOS) image sensor, etc., and a size of the image sensor gradually becomes smaller, so that a size of the camera lens of the portable electronic product is also reduced to satisfy the demand of portability. According to a current technique, although the lens on the portable electronic product has the advantage of small size, it has a poor imaging quality due to a serious reflection problem between interfaces of different materials.

SUMMARY OF THE INVENTION

The invention is directed to a micro-lens module, which has an improved imaging quality and a miniaturized size while considering a manufacturing convenience.

The invention provides a micro-lens module including a plurality of lens groups. The lens groups are disposed between an object side and an image side, where at least one lens group in the lens groups is composed by a complex lens. The complex lens includes a plurality of lenses adhered to each other, and a refractive index of at least one lens in the lenses is different from refractive indexes of the other lens.

In an embodiment of the invention, the lens groups include a first lens group. The first lens group is disposed between the object side and the image side, where the first lens group is composed by the complex lens. The complex lens includes a first lens and a second lens. The first lens is disposed between the object side and the image side. The second lens is disposed between the first lens and the image side. A plane of the second lens serves as an aperture stop of the micro-lens module.

In an embodiment of the invention, the first lens group has a positive refractive power.

In an embodiment of the invention, the first lens is a plano-concave lens. A concave surface of the first lens faces to the object side, and a plano-surface of the first lens faces to the image side and is adhered to a first plane of the second lens to form the aperture stop.

In an embodiment of the invention, the first lens is a plano-convex lens. A convex surface of the first lens faces to the object side, and a plano-surface of the first lens faces to the image side and is adhered to a first plane of the second lens, and a second plane of the second lens serves as the aperture stop.

In an embodiment of the invention, the second lens is transparent flat panel.

In an embodiment of the invention, the first lens and the second lens have different refractive indexes.

In an embodiment of the invention, the complex lens further includes a third lens disposed between the second lens and the image side.

In an embodiment of the invention, the third lens is a plano-convex lens. A convex surface of the third lens faces to the object side, and a plano-surface of the third lens faces to the image side and is adhered to the second lens.

In an embodiment of the invention, the third lens and the second lens have different refractive indexes.

In an embodiment of the invention, the lens groups further include a second lens group disposed between the first lens group and the image side.

In an embodiment of the invention, the second lens group has a negative refractive power.

In an embodiment of the invention, the second lens group includes a concave-convex lens. A convex surface of the concave-convex lens faces to the object side, and a concave surface of the concave-convex lens faces to the image side.

In an embodiment of the invention, the second lens group has a positive refractive power.

In an embodiment of the invention, the second lens group includes a concave-convex lens. A concave surface of the concave-convex lens faces to the object side, and a convex surface of the concave-convex lens faces to the image side.

In an embodiment of the invention, the lens groups further include a third lens group disposed between the second lens group and the image side.

In an embodiment of the invention, the third lens group has a negative refractive power.

In an embodiment of the invention, the third lens group includes a double concave lens.

According to the above descriptions, based on a combination of the complex lens group and other lens groups, the micro-lens module of the invention may have an improved imaging quality and a miniaturized size while considering a manufacturing convenience.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In exemplary embodiments of the invention, a micro-lens module includes a plurality of lens groups arranged from an object side to an image side, where at least one of the lens groups is composed by a complex lens. The complex lens includes a plurality of lenses adhered to each other, and a refractive index of at least one of the lenses is different to that of the other lenses.

First Embodiment

Figure 1A:
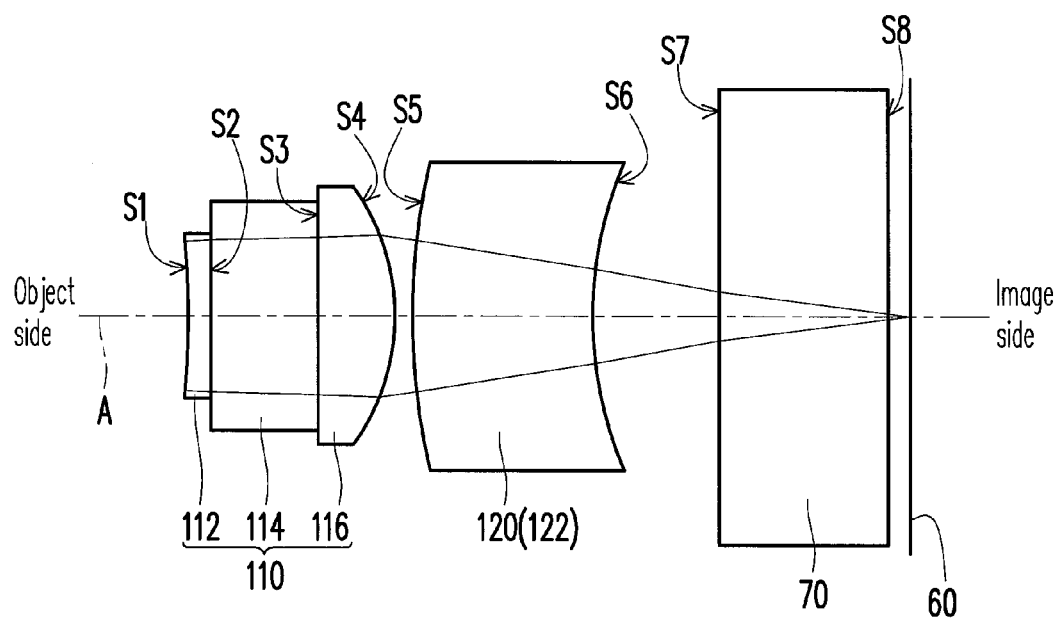
FIG. 1A is a structural schematic diagram of a micro-lens module according to a first embodiment of the invention.

FIG. 1A is a structural schematic diagram of a micro-lens module according to a first embodiment of the invention. Referring to FIG. 1A, in the present embodiment, the micro-lens module 100 includes a first lens group 110 and a second lens group 120. The first lens group 110 is disposed between an object side and the second lens group 120, and is composed by a complex lens, and has a positive refractive power. The complex lens includes a first lens 112, a second lens 114 and a third lens 116 sequentially arranged from the object side to an image side. In an exemplary embodiment of the invention, the complex lens is formed by a plurality of lenses adhered to each other, and a refractive index of at least one of the lenses is different to refractive indexes of the other lenses. For example, the second lens 114 has a refractive index different to that of the first lens 112 and the third lend 116, and the three lenses are adhered to form the complex lens.

In detail, in the present embodiment, the first lens 112 is a plano-concave lens, and a concave surface S1 thereof faces to the object side, and a plano-surface S2 thereof faces to the image side and is adhered to a plane of the second lens 114 to form an aperture stop. The second lens 114 is, for example, a transparent flat panel of a glass material, where a plane thereof facing to the object side is adhered to the first lens 112, and a plane thereof facing to the image side is adhered to the third lens 116. The third lens 116 is a plano-convex lens, and a plano-surface S3 thereof faces to the object side and is adhered to the plane of the second lens 114, and a convex surface S4 thereof faces to the image side. In other words, one of the planes of the second lens 114 (i.e. the transparent flat panel) is adhered to the plano-surface S2 of the first lens 112 to serve as the aperture stop of the micro-lens module 100, and another plane thereof is adhered to the plano-surface S3 of the third lens 116.

The second lens group 120 is disposed between the first lens group 110 and the image side, and has a negative refractive power. The second lens group 120 includes a concave-convex lens 122. A convex surface S5 of the concave-convex lens 122 faces to the object side, and a concave surface S6 of the concave-convex lens 122 faces to the image side.

In the present embodiment, the micro-lens module 100 further includes a protection cover 70 disposed between the second lens group 120 and the image side for protecting an image sensor 60 located between a surface S8 and the image side. The protection cover 70 has two surfaces S7 and S8, where the surface S7 faces to the object side, and the surface S8 faces to the image side. In the present embodiment, a material of the protection cover 70 is a transparent material, for example, glass, or transparent resins, etc., and the image sensor 60 can be a charge coupled device (CCD), or a complementary metal-oxide-semiconductor (CMOS) sensor, etc.

An embodiment of the micro-lens module 100 is provided below. It should be noticed that data listed in following table one and table two are not used to limit the invention, and those skilled in the art can suitably change the parameters or settings therein without departing from the scope of the invention.

TABLE ONE

| Surface | Radius of curvature (mm) | Space (mm) | Refractive index | Abbe number | Remark |
|---|---|---|---|---|---|
| S1 | −5.128 | 0.0563 | 1.52 | 50 | |
| S2 | Infinity | 0.2567 | 1.51 | 70 | Aperture stop |
| S3 | Infinity | 0.1815 | 1.52 | 50 | |

TABLE ONE-continued

| Surface | Radius of curvature (mm) | Space (mm) | Refractive index | Abbe number | Remark |
|---|---|---|---|---|---|
| S4 | −0.513 | 0.0428 | | | |
| S5 | 1.471 | 0.4321 | 1.52 | 50 | |
| S6 | 1.071 | 0.3 | | | |
| S7 | Infinity | 0.4 | 1.5168 | 64.17 | |
| S8 | Infinity | 0.063 | | | |

In the table one, the space refers to a straight-line distance between two adjacent surfaces along an optical axis A. For example, the space of the surface S3 refers to a straight-line distance between the surface S3 and the surface S4 along the optical axis A. Thickness, refractive index and Abbe number corresponding to each optical device in the remark field are the same to the space, refractive index and Abbe number in the same row. Moreover, in the table one, the surfaces S1 and S2 are two surfaces of the first lens 112, the surfaces S3 and S4 are two surfaces of the third lens 116, the surfaces S5 and S6 are two surfaces of the concave-convex lens 122 of the second lens group 120, and the surfaces S7 and S8 are two surfaces of the protection cover 70, where a value filled in the space field in the row of the surface S8 is a distance between the surface S8 and the image sensor 60.

Referring to the table one for the parameters such as the radius of curvature, the space, etc. of each surface, and details thereof are not repeated herein.

The surfaces S1, S4, S5 and S6 are even aspheric, which can be represented by a following equation:

$$Z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the equation, Z represents a sag along a direction of the optical axis A, c is a reciprocal of a radius of an osculating sphere, i.e. a reciprocal of a radius of curvature (for example, the radius of curvatures of S1, S4, S5 and S6 in the table one) near the optical axis A. k is a conic coefficient, r is a height of an aspheric surface, i.e. a height from a center to an edge of a lens, and $\alpha_1$-$\alpha_8$ are aspheric coefficients, and in the present embodiment, the coefficient $\alpha_1$ is 0. Parameters of the surfaces S1, S4, S5 and S6 are listed in a table two.

TABLE TWO

| Aspheric parameter | Conic coefficient k | Coefficient $\alpha_2$ | Coefficient $\alpha_3$ | Coefficient $\alpha_4$ |
|---|---|---|---|---|
| S1 | 0 | −2.6132567 | 73.09426 | −3041.4389 |
| S4 | −13.60203 | −9.6468524 | 126.87827 | −1731.2702 |
| S5 | −49.9946 | 4.1097678 | −64.356174 | 596.94837 |
| S6 | 1.095574 | 1.859126 | −19.888752 | 133.55797 |

| Aspheric parameter | Coefficient $\alpha_5$ | Coefficient $\alpha_6$ | Coefficient $\alpha_7$ | Coefficient $\alpha_8$ |
|---|---|---|---|---|
| S1 | 37217.507 | 1144.2817 | −3587.0147 | 228907.05 |
| S4 | 12969.31 | 2396.5052 | −737768.44 | 3417732.6 |
| S5 | −1981.0921 | −11973.786 | 115195.88 | −252363.83 |
| S6 | −398.74397 | −480.14211 | 5863.3082 | −9972.8141 |

Moreover, in the present embodiment, an F number of the micro-lens module 100 is 2.8, and effective focal length is 1 mm, a field of view (FOV) is 60 degrees, an effective focal length of the first lens group 110 is 1.05 mm, and an effective focal length of the second lens group 120 is −12.01 mm, though the invention is not limited thereto.

Figure 1B:
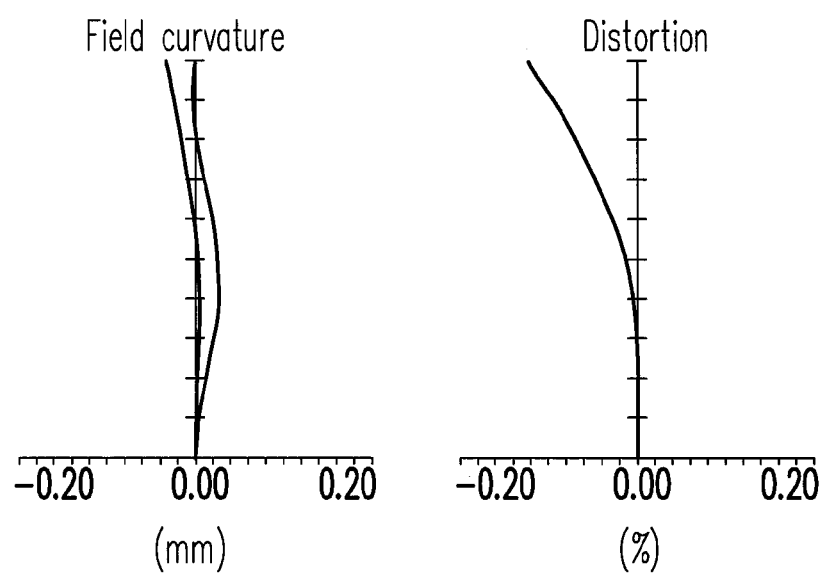
FIG. 1B and FIG. 1C are imaging optical simulation data diagrams of the micro-lens module of FIG. 1A.
Figure 1C:
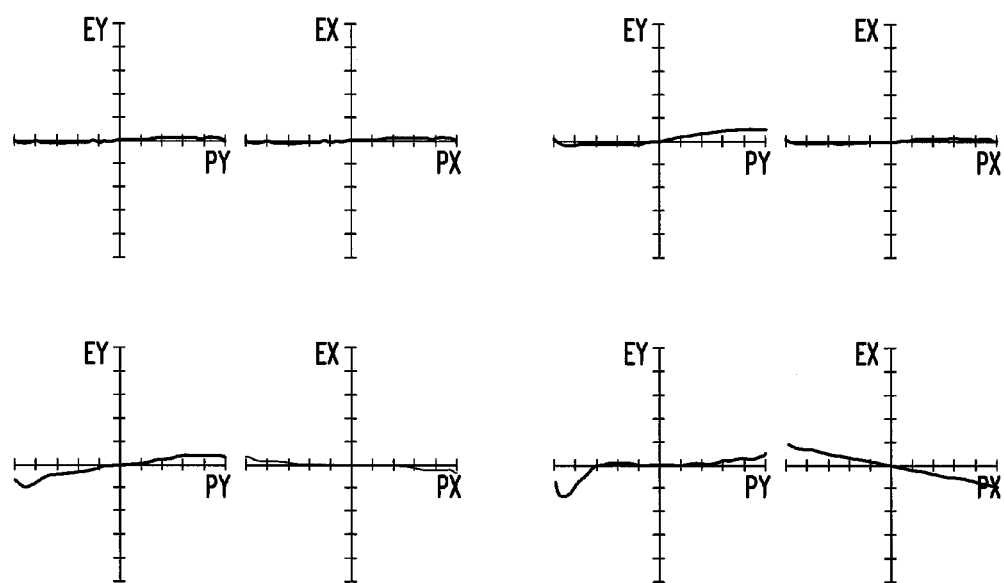

FIG. 1B and FIG. 1C are imaging optical simulation data diagrams of the micro-lens module 100 of FIG. 1A. Referring to FIG. 1B, in which a field curvature diagram and a distortion diagram are respectively illustrated from the left to the right. Moreover, FIG. 1C is a transverse ray fan plot of images. According to FIG. 1B and FIG. 1C, it is known that the micro-lens module 100 of the present embodiment may have a good imaging quality while maintaining a miniaturized size.

Second Embodiment

Figure 2A:
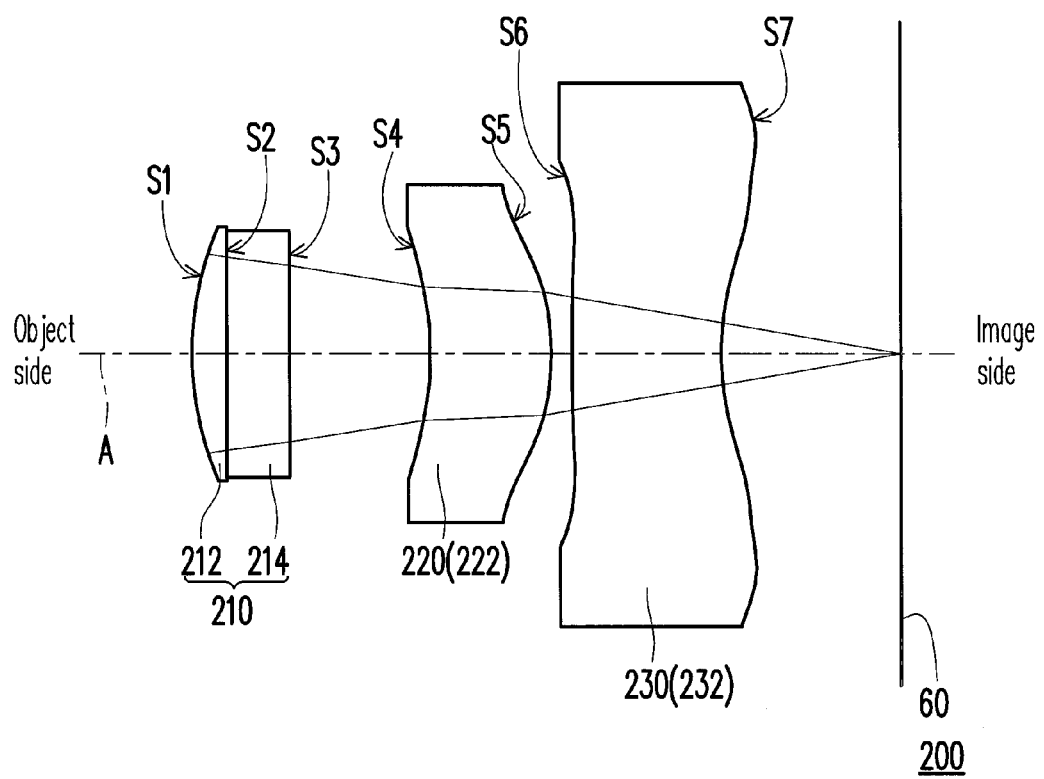
FIG. 2A is a structural schematic diagram of a micro-lens module according to a second embodiment of the invention.

FIG. 2A is a structural schematic diagram of a micro-lens module 200 according to a second embodiment of the invention. Referring to FIG. 2A, the micro-lens module 200 of the present embodiment is similar to the micro-lens module 100 of FIG. 1A, and differences there between are described below.

In detail, in the present embodiment, the micro-lens module 100 includes a first lens group 210, a second lens group 220 and a third lens group 230. The first lens group 210 is disposed between the object side and the second lens group 220, and is formed by a complex lens, and has a positive refractive power. The complex lens includes a first lens 212 and a second lens 214 sequentially arranged from the object side to the image side. In an exemplary embodiment of the invention, the complex lens is formed by a plurality of lenses adhered to each other, and a refractive index of at least one of the lenses is different to refractive indexes of the other lenses. For example, the second lens 214 has a refractive index different to that of the first lens 212, and the two lenses are adhered to form the complex lens.

In detail, in the present embodiment, the first lens 212 is a plano-convex lens, and a convex surface S1 thereof faces to the object side, and a plano-surface S2 thereof faces to the image side and is adhered to a plane of the second lens 214. The second lens 214 is, for example, a transparent flat panel of a glass material, where a plane thereof facing to the object side is adhered to the first lens 212, and a plane S3 thereof facing to the image side serves as an aperture stop of the micro-lens module 200. In other words, one of the planes of the second lens 214 (i.e. the transparent flat panel) is adhered to the plano-surface S2 of the first lens 212, and another plane S3 thereof serves as an aperture stop of the micro-lens module 200.

The second lens group 220 is disposed between the first lens group 210 and the third lens group 230, and has a positive refractive power. The second lens group 220 includes a concave-convex lens 122. A concave surface S4 of the concave-convex lens 122 faces to the object side, and a convex surface S5 of the concave-convex lens 122 faces to the image side.

The third lens group 230 is disposed between the second lens group 210 and the image side, and has a negative refractive power. The third lens group 230 includes a double concave lens 232. One concave surface S6 of the double concave lens 232 faces to the object side, and another concave surface S7 of the double concave lens 232 faces to the image side.

An embodiment of the micro-lens module 200 is provided below. It should be noticed that data listed in following table three and table four are not used to limit the invention, and those skilled in the art can suitably change the parameters or settings therein without departing from the scope of the invention.

TABLE THREE

| Surface | Radius of curvature (mm) | Space (mm) | Refractive index | Abbe number | Remark |
|---|---|---|---|---|---|
| S1 | 0.543 | 0.062 | 1.52 | 40 | |
| S2 | Infinity | 0.113 | 1.5 | 70 | |
| S3 | Infinity | 0.252 | | | Aperture stop |
| S4 | −0.559 | 0.218 | 1.52 | 40 | |
| S5 | −0.412 | 0.037 | | | |
| S6 | 1.058 | 0.268 | 1.52 | 40 | |
| S7 | 0.419 | 0.32 | | | |

In the table three, the space refers to a straight-line distance between two adjacent surfaces along the optical axis A. For example, the space of the surface S2 refers to a straight-line distance between the surface S2 and the surface S3 along the optical axis A. Thickness, refractive index and Abbe number corresponding to each optical device in the remark field are the same to the space, refractive index and Abbe number in the same row. Moreover, in the table three, the surfaces S1 and S2 are two surfaces of the first lens 212, the surface S3 is a surface of the second lens 214 facing to the image side. The surfaces S4 and S5 are two surfaces of the concave-convex lens 122 of the second lens group 220, and the surfaces S6 and S7 are two surfaces of the double concave lens 232 of the third lens group 230, where a value filled in the space field in the row of the surface S7 is a distance between the surface S7 and the image sensor 60. Parameters of the radius curvature, the space, etc. of each surface are the same as that of the table one, which are not repeated herein.

The surfaces S1, S4-S7 are even aspheric, which can be represented by a following equation:

$$Z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the equation, Z represents a sag along a direction of the optical axis A, c is a reciprocal of a radius of an osculating sphere, i.e. a reciprocal of a radius of curvature (for example, the radius of curvatures of S1, S4-S7 in the table three) near the optical axis A. k is a conic coefficient, r is a height of an aspheric surface, i.e. a height from a center to an edge of a lens, and $\alpha_1$-$\alpha_8$ are aspheric coefficients, and in the present embodiment, the coefficient $\alpha_1$ is 0. Parameters of the surfaces S1, S4-S7 are listed in a table four.

TABLE FOUR

| Aspheric parameter | Conic coefficient k | Coefficient $\alpha_4$ | Coefficient $\alpha_6$ | Coefficient $\alpha_8$ |
|---|---|---|---|---|
| S1 | −1.985344 | 0.39830692 | 79.734491 | −4293.4651 |
| S4 | 1.009072 | 3.8627566 | −99.620944 | 3319.1778 |
| S5 | −0.3657169 | −1.3213484 | 41.887818 | 242.93475 |
| S6 | −26.07048 | −8.3314915 | 50.785626 | −87.098172 |
| S7 | −4.562179 | −4.111591 | 16.799286 | −53.80389 |

| Aspheric parameter | Coefficient $\alpha_{10}$ | Coefficient $\alpha_{12}$ | Coefficient $\alpha_{14}$ | Coefficient $\alpha_{16}$ |
|---|---|---|---|---|
| S1 | 126958.3 | −2163674.1 | 20373372 | −84342272 |
| S4 | −23083.127 | −181668 | 3043625.1 | −11724432 |
| S5 | −1859.6716 | 65581.914 | −730048.87 | 2179734.6 |
| S6 | −346.10506 | −944.94374 | 22733.869 | −65926.447 |
| S7 | 71.812073 | −246.09396 | 1238.599 | −1943.0817 |

Moreover, in the present embodiment, an F number of the micro-lens module 200 is 2.8, and effective focal length is 1 mm, a field of view (FOV) is 60 degrees, an effective focal length of the first lens group 210 is 1.04 mm, an effective focal length of the second lens group 220 is 2 mm, and an effective focal length of the third lens group 230 is −1.56 mm, though the invention is not limited thereto.

Figure 2B:
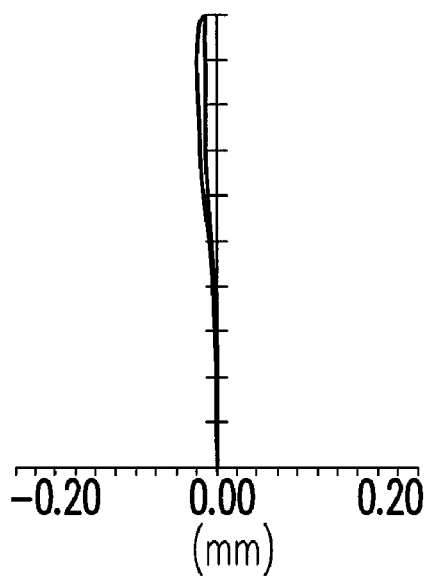
FIG. 2B and FIG. 2C are imaging optical simulation data diagrams of the micro-lens module of FIG. 2A.
Figure 2B:
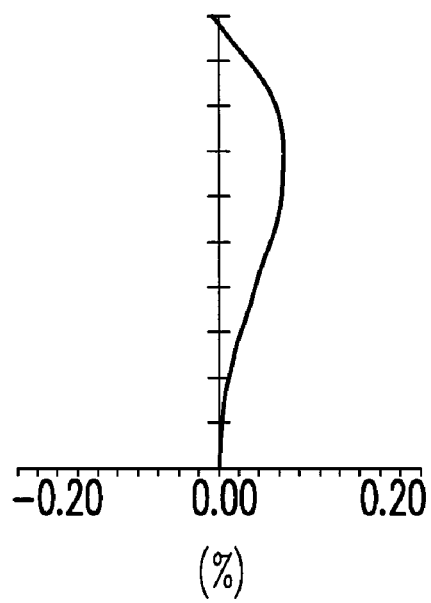
Figure 2C:
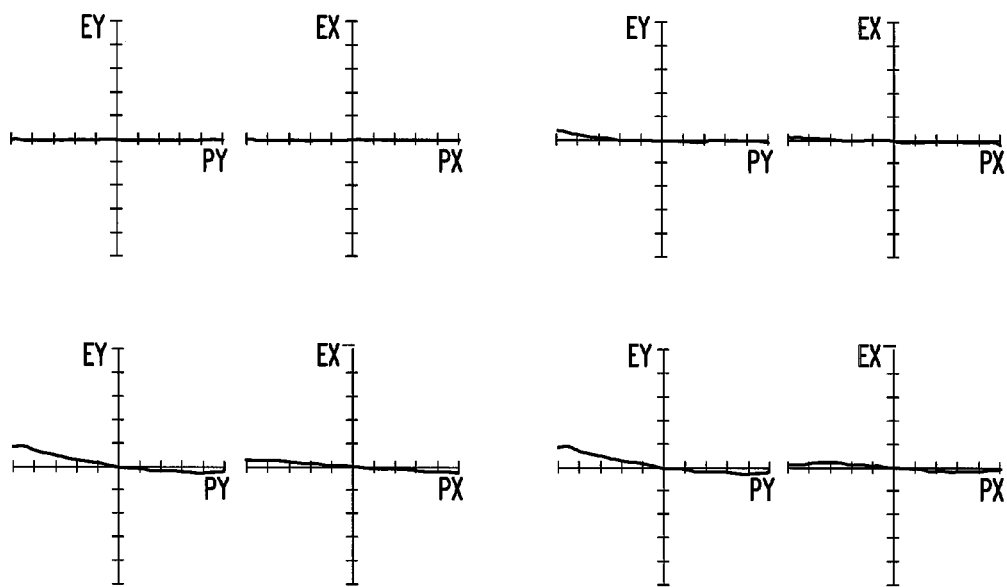

FIG. 2B and FIG. 2C are imaging optical simulation data diagrams of the micro-lens module 200 of FIG. 2A. Referring to FIG. 2B, in which a field curvature diagram and a distortion diagram are respectively illustrated from the left to the right. Moreover, FIG. 2C is a transverse ray fan plot of images. According to FIG. 2B and FIG. 2C, it is known that the micro-lens module 200 of the present embodiment may have a good imaging quality while maintaining a miniaturized size.

In summary, based on a combination of the complex lens group and other lens groups, the micro-lens module of the invention may have an improved imaging quality and a miniaturized size while considering a manufacturing convenience.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A micro-lens module, comprising:
a plurality of lens groups disposed between an object side and an image side, wherein at least one lens group in the lens groups is composed by a complex lens, the complex lens comprises a plurality of lenses adhered to each other, and a refractive index of at least one lens in the lenses is different from refractive indexes of the other lenses, wherein the lens groups comprise:
a first lens group disposed between the object side and the image side, wherein the first lens group is composed by the complex lens, and the complex lens comprises:
a first lens disposed between the object side and the image side; and
a second lens disposed between the first lens and the image side, wherein a plane of the second lens serves as an aperture stop of the micro-lens module,
wherein the lens groups further comprise a second lens group disposed between the first lens group and the image side, the second lens group has a negative refractive power, and the second lens group comprises a concave-convex lens, a convex surface of the concave-convex lens faces to the object side, and a concave surface of the concave-convex lens faces to the image side.

2. The micro-lens module as claimed in claim 1, wherein the first lens group has a positive refractive power.

3. The micro-lens module as claimed in claim 1, wherein the first lens is a plano-concave lens, a concave surface of the first lens faces to the object side, and a plano-surface of the first lens faces to the image side and is adhered to a first plane of the second lens to form the aperture stop.

4. The micro-lens module as claimed in claim 1, wherein the second lens is transparent flat panel.

5. The micro-lens module as claimed in claim 1, wherein the first lens and the second lens have different refractive indexes.

6. The micro-lens module as claimed in claim 1, wherein the complex lens further comprises a third lens disposed between the second lens and the image side.

7. The micro-lens module as claimed in claim 6, wherein the third lens is a plano-convex lens, a convex surface of the third lens faces to the image side, and a plano-surface of the third lens faces to the object side and is adhered to the second lens.

8. The micro-lens module as claimed in claim 6, wherein the third lens and the second lens have different refractive indexes.

9. The micro-lens module as claimed in claim 1, wherein the lens groups further comprise:
a third lens group disposed between the second lens group and the image side.

10. The micro-lens module as claimed in claim 9, wherein the third lens group has a negative refractive power.

11. The micro-lens module as claimed in claim 9, wherein the third lens group comprises a double concave lens.

12. A micro-lens module, comprising:
a plurality of lens groups disposed between an object side and an image side, wherein at least one lens group in the lens groups is composed by a complex lens, the complex lens comprises a plurality of lenses adhered to each other, and a refractive index of at least one lens in the lenses is different from refractive indexes of the other lenses, wherein the lens groups comprise:
a first lens group disposed between the object side and the image side, wherein the first lens group is composed by the complex lens, and the complex lens comprises:
a first lens disposed between the object side and the image side; and
a second lens disposed between the first lens and the image side, wherein a plane of the second lens serves as an aperture stop of the micro-lens module,
wherein the lens groups further comprise a second lens group disposed between the first lens group and the image side, and the second lens group has a positive refractive power.

13. The micro-lens module as claimed in claim 12, wherein the first lens group has a positive refractive power.

14. The micro-lens module as claimed in claim 12, wherein the first lens is a plano-convex lens, a convex surface of the first lens faces to the object side, and a plano-surface of the first lens faces to the image side and is adhered to a first plane of the second lens, and a second plane of the second lens serves as the aperture stop.

15. The micro-lens module as claimed in claim 12, wherein the second lens is transparent flat panel.

16. The micro-lens module as claimed in claim 12, wherein the first lens and the second lens have different refractive indexes.

17. The micro-lens module as claimed in claim 12, wherein the second lens group comprises a concave-convex lens, a concave surface of the concave-convex lens faces to the object side, and a convex surface of the concave-convex lens faces to the image side.

18. The micro-lens module as claimed in claim 12, wherein the lens groups further comprise:
a third lens group disposed between the second lens group and the image side.

19. The micro-lens module as claimed in claim 18, wherein the third lens group has a negative refractive power.

20. The micro-lens module as claimed in claim 18, wherein the third lens group comprises a double concave lens.

* * * * *